Jan. 28, 1941.    R. HAWLITSCHECK ET AL    2,230,036
REGULATOR FOR INTERNAL COMBUSTION ENGINES
Filed Aug. 16, 1939    4 Sheets-Sheet 1

Inventors:
Rudolf Hawlitscheck,
Fritz Böttger,
Attorneys

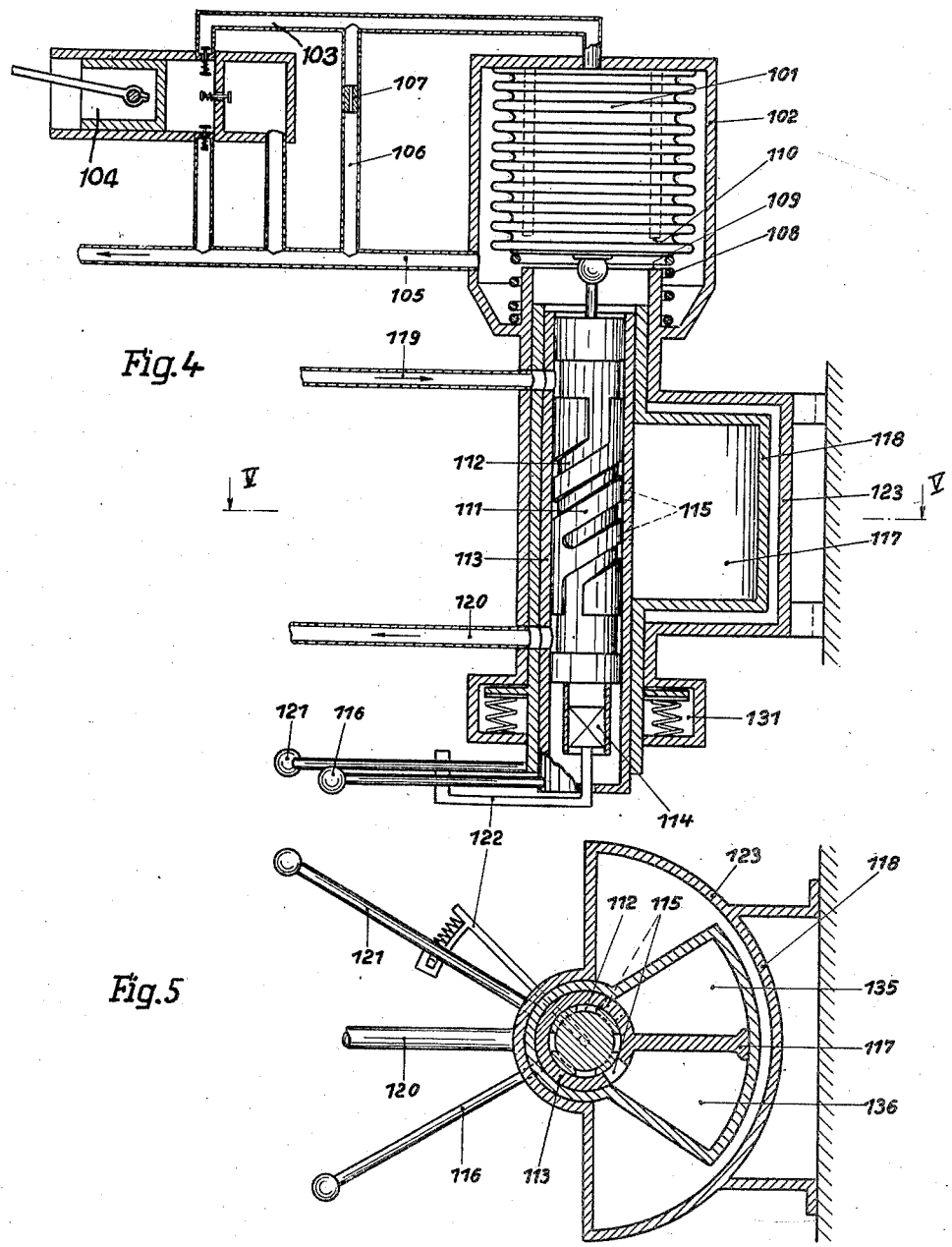

Patented Jan. 28, 1941

2,230,036

UNITED STATES PATENT OFFICE 2,230,036

REGULATOR FOR INTERNAL COMBUSTION ENGINES

Rudolf Hawlitscheck, Dessau, and Fritz Böttger, Dessau-Ziebigk, Germany, assignors to Junkers Flugzeug - und - Motorenwerke Aktiengesellschaft, a corporation of Germany Application August 16, 1939, Serial No. 290,474
In Germany August 31, 1938

17 Claims. (Cl. 123—75)

This invention relates to an apparatus for automatically regulating internal combustion engines.

Regulators for internal combustion engines are known which have two essential features, namely, a pressure-sensitive regulating member, and a chamber having a wall adapted to move under the pressure of fluid, such as oil.

In such regulators the pressure-sensitive regulating member is subject, on one hand, to a constant pressure, for example, of the intake or vacuum chamber, and, on the other hand, to a pressure dependent on the operative state of the motor.

Relative to the chamber with the movable wall, on the one hand, such wall is subjected on the inner side of the operative chamber to the action of a pressure agent, for example, oil, controlled by the pressure sensitive regulating member; and, on the other hand, to the action of a force, for example, a spring, directed opposite to the pressure agent. The pressure agent is supplied continuously to the operative chamber through a narrow opening, and passes from the chamber through an outlet valve controlled directly by the pressure sensitive member.

The operative chamber is thus always filled, more or less, with the pressure agent, and is traversed by the pressure agent in one direction only regardless of the direction of operation of the regulating apparatus.

With such an arrangement any point of leakage in the operative chamber, as well as any break or leak in the pressure sensitive member, will cause the automatic regulation to become irregular since the regulator will be actuated in an undesired manner. With such arrangements a hand adjustment is also possible. Hand adjustments have been provided which serve to adjust the production conditions to be regulated but which do not exert any influence on the automatic regulation. Provision is made to prevent overload of the motor through the action of the hand adjustment lever.

The present invention relates to this general type of control arrangement for internal combustion engines which is also provided with means for manual adjustment. One of the principal objects of the present invention is to provide such an arrangement in which the operative chamber for the pressure agent is of special construction, resulting in various advantages not present in known arrangements.

Another object of the invention resides in providing a control arrangement for internal combustion engines in which there is a substantial improvement in the precision adjustment of the pressure sensitive regulating member. A further object of the invention resides in providing such an arrangement which is of particularly compact construction and which provides multiple adjustment possibilities.

The invention has for a further object the provision of a regulator consisting substantially of a hydraulic equalizing or compensating drive which operates with at least two degrees of freedom dependent on at least two determinative magnitudes, and which in addition is manually adjustable.

According to a modification of the invention, it is possible, through the specific construction of one part of the hydraulic governor as a piston servomotor, to superimpose three influences, or groups of influences, so that all of the influences can be utilized to shift the single adjusting member.

Other objects and advantages of the invention will be apparent from the following specification when read in connection with the accompanying drawings showing two exemplary embodiments of the invention, and in which:

Fig. 4 is a longitudinal section through another embodiment showing the use of the invention with an injection pump governor;

Fig. 5 is a view on the line V—V of Fig. 4; and

Figure 1:
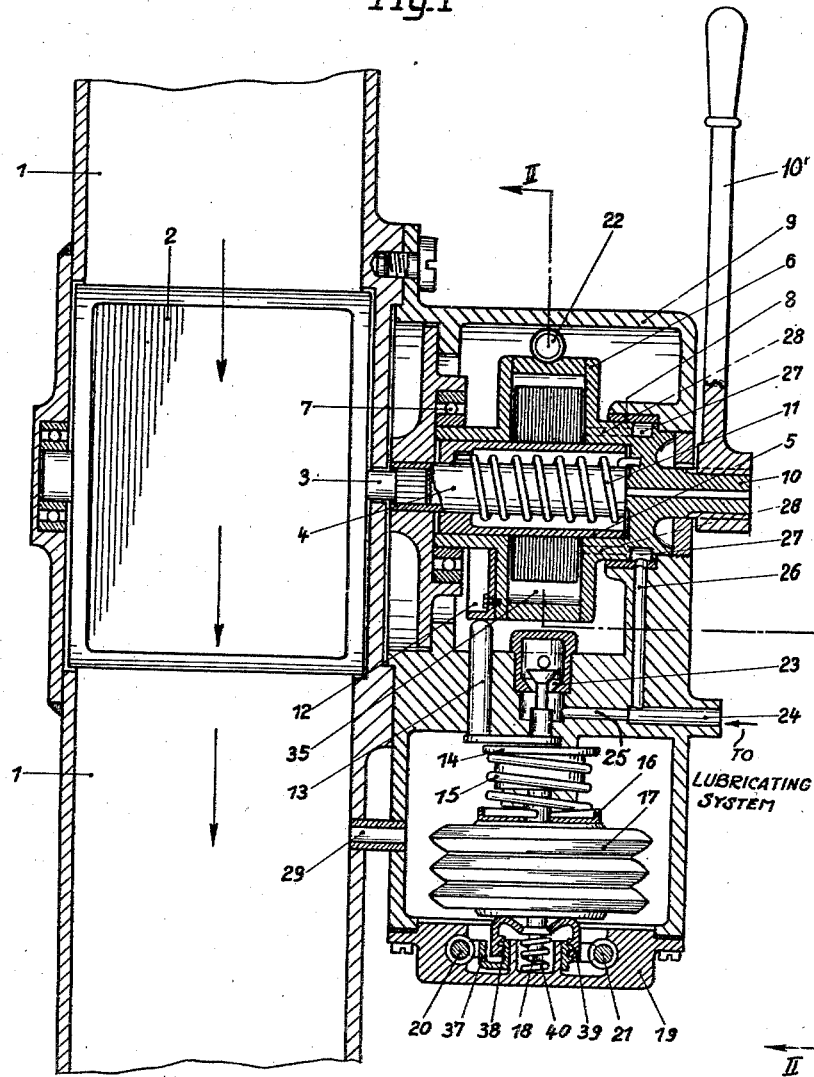
Fig. 1 is a longitudinal section of a control arrangement according to one embodiment of the invention.
Figure 2:
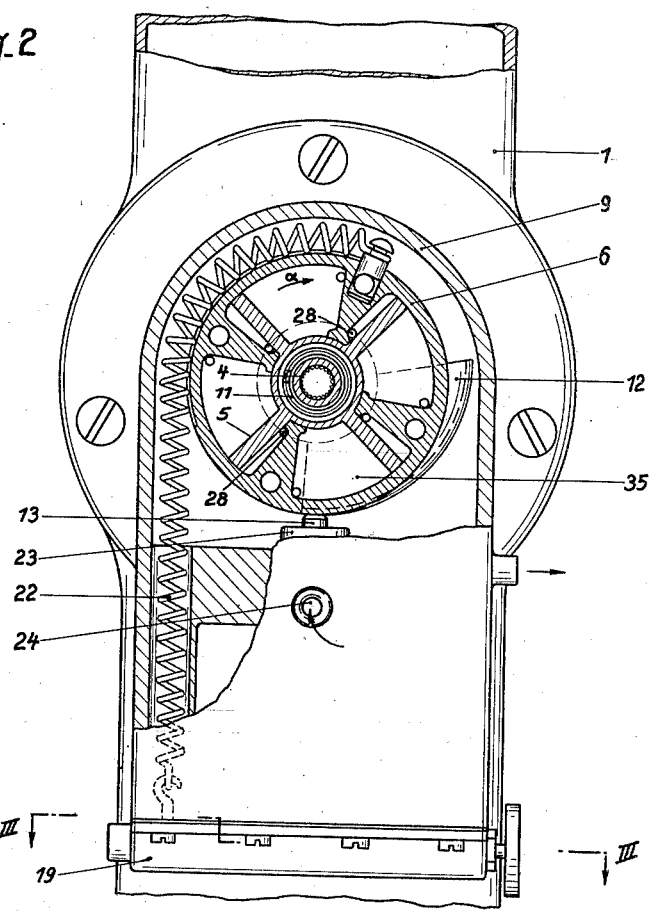
Fig. 2 is a vertical section on the line II—II of Fig. 1.
Figure 3:
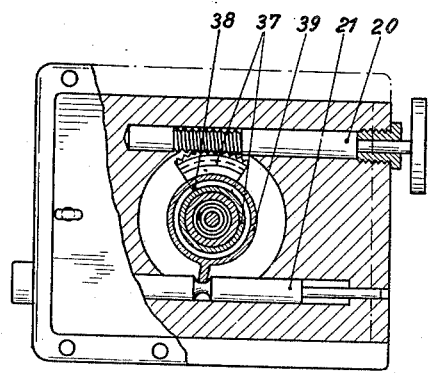
Fig. 3 is a cross section taken through the section line III—III of Fig. 2.

Referring now with greater particularity to the embodiment disclosed in Figs. 1, 2 and 3 of the drawings, a throttle valve 2 is mounted for rotation in the pressure pipe 1 of an air compressor or charging blower. The throttle valve 2 is journalled in the pressure pipe 1 to rotate about an axis in line with the rotational axis of the pin 3. The pin 3 is provided with a notched part, or denture, on which is mounted a sleeve 4, the axis of which is likewise in alignment with the rotational axis of the throttle valve. In Fig. 1, part of the sleeve is broken away for purposes of showing this.

Rigidly connected with the sleeve 4 is a wing piston 5 which is encompassed or disposed within the housing 6 of an adjusting member. The housing is multi-cellular in form, the number of cells depending on the number of wings of the piston 5. As shown to good advantage in Fig. 2, the housing 6 has four compartments 35 and four wings of the piston 5.

The housing 6 is rotatably journalled in an outer case 8 in the governor housing 9, on one side by means of a ball bearing 7, and on the other by a cylindrical extension.

On the side of the adjusting member housing 6 farthest from the throttle valve, there is a shaft 10 provided with teeth which serve for engagement with a hand lever (not shown).

The wing piston 5 and the housing 6 are constructed in complementary form and are positively interconnected, for example, by means of the spiral spring 11 disposed above the sleeve 4 and which during operation is subjected to torsional twisting. The spring is mounted at one end in the shaft 10 and at the other in the wing piston 5. The spring 11 provides the limit positions of the two rotating parts 5 and 6 as shown in Fig. 2.

The housing 6 is provided on a portion of its outer periphery with a cam-shaped part 12. This cam-shaped part acts through an impact member 13, slidable in a bore in the housing, on the spring plate 14 and the spring 15. A second spring plate 16 contacting with the spring 15 bears against a pressure sensitive regulating member 17. The pressure sensitive regulating member 17 in turn is supported by a cylindrical pin 18 disposed in the housing cover 19 of the device. The pressure sensitive member 17 may be of the usual bellows shape adapted to expand and contract under the action of external pressure.

The chamber, in which the regulating member 17 is located, is connected by suitable means, such as by the tubular passage 29, with the pressure passage 1, behind the throttle valve 2. The chamber is thus subjected to the same pressure which prevails in pressure passage 1 behind (that is, below) the throttle valve 2.

The pin 18 is journalled in the housing cover 19 of the regulating apparatus or governor and is adjustable axially through a suitable spindle drive 20, whereby the length of the pressure member 17 is manually adjustable on normal load. On the other hand, the pin can be actuated in the same direction by means of a second drive 21, which is connected, for example, in an injection type combustion engine, with the lubricating rod arrangement.

A particularly compact construction for the arrangement of the spindle drive 20, and the parallel operating drive 21, is shown in Figs. 1 and 3. The drive 20 operates on a part 37 rotatably journalled in the housing 19. The part 37 is provided with a worm path 38 in which moves a complementary annular part 39 connected with the drive member 21. The pin 18 is urged against the annular part 39 by means of the spiral spring 40.

As shown in Fig. 2, the housing 6, which is rotatably journalled, is provided with a spiral spring pull 22 attached at its upper end to the housing 6, and at its lower end to the housing cover 19.

A rigid operating connection is provided between the pressure sensitive regulating member 17 and the regulating valve 23. The regulating valve 23 is interposed in an oil circuit. The pressure oil which comes from a pressure source (not shown) passes through the bore 24 (Fig. 1) into the housing where it divided into two branches 25 and 26. The main branch 25 leads through the regulating valve 23 to the oil discharge. The other branch 26 passes to an annular groove 27 in the member 10, and from there through openings 28 in the housing 6, just back of the individual wings of the piston 5. These openings 28 are clearly indicated by Figs. 1 and 2.

Oil under pressure passing out through the leak points from the chambers 35 between the piston 5 and the housing 6 can be passed at a suitable point to an oil discharge passage (not shown).

In describing the operation of the device, the operation will be described first in the case in which the throttle valve 2 is shifted only by means of the pressure sensitive regulating member 17. The member 17 is adjusted by the drive 20 to a predetermined pressure as will be present behind the throttle valve 2 of the charger. When this predetermined pressure prevails behind the throttle valve 2 in the pressure passage 1, a similar pressure will prevail in the chamber surrounding the pressure sensitive regulating member 17, since this chamber is connected to the pressure passage 1 by means of the passage 29. The position of the pressure sensitive member and the valve 23 (which is rigidly connected therewith) is then such that the valve 23 is in completely open position. The pressure oil therefore flows through the oil inlet 24 directly through the regulating valve 23 and into the oil discharge passage (not shown). Consequently, the remaining oil in the governor is subjected to little or no pressure. The wing piston 5 and the housing 6, by reason of the action of their common spiral spring 11, are thus in the relative positions shown in Fig. 2.

When the pressure rises above normal behind the throttle valve 2, then, inasmuch as this same pressure will also prevail in the chamber surrounding the pressure sensitive member 17, the member 17 will be compressed. This will result in closing the regulating valve 23 to a corresponding degree. Consequently, there will be an increase of pressure in the oil passage 26 and in the oil system of the governor connected therewith. This will move the piston with respect to the housing 6 in the direction of the arrow $a$ of Fig. 2. The piston 5 will thereby carry the drive pin 3 of the throttle valve 2 along with it, whereby the throttle valve will be closed to a corresponding degree.

Conversely, when the pressure drops in the pipe 1 behind the throttle valve 2, the pressure sensitive member 17 is expanded. The valve 23 thus progressively opens and the oil pressure drops in the chambers 35 between one wall thereof and wings of the piston 5. The piston 5 is thus moved by the spiral spring 11 in a direction opposite to that indicated by the arrow $a$ on Fig. 2. At the same time the throttle valve 2 is opened so that the pressure increases to normal.

In addition to the automatic regulation just described, the arrangement provides two possibilities for manual adjustment. One of these is through the shaft 10, which, as mentioned, is adapted to be connected to a handle 10′, while the other possibility is through the drive 21. This latter adjustment permits an emergency operation, that is, an operation under conditions exceeding the nominal load during a certain short period of time, whereby the pressure to be regulated by the regulating member 17 is set higher. The regulation in such case is fundamentally the same as that previously described.

While the piston 5, on automatic operation of the device, is controlled by the pressure sensitive member 17 and the valve 23 through the oil pressure; in the case of manual adjustment, the operation through the shaft 10 results in movement of the piston in accordance with the movement of the housing 6. In other words, when the housing 6 is moved to the right, the piston 5 is carried along thereby, and the throttle valve 2 is thus shifted. Conversely, when the housing 6 is turned to the left through the shaft 10, the piston 5 is drawn along by reason of a slight pressure or suction in the chambers 35, and throttle valve 2 is thus shifted in the opposite direction.

It is impossible to open the throttle valve through operation of the hand lever beyond the maximum determined by the housing, since, in this case, the rotary piston 5 remains behind to a considerable extent, with respect to the housing 6. The pressure sensitive member 17 thus protects the motor from being adjusted to an excessively high, injurious charging pressure through the hand lever.

If, for example, the manually actuated handle adapted to be secured on the shaft 10 is rendered inoperative, for example, by breaking such handle, the housing 6 is drawn by the traction spring 22 into a completely open position, whereby, however, the wing piston 5 is correspondingly shifted so as to maintain a state of equilibrium of the governor through the oil pressure.

Figure 6:
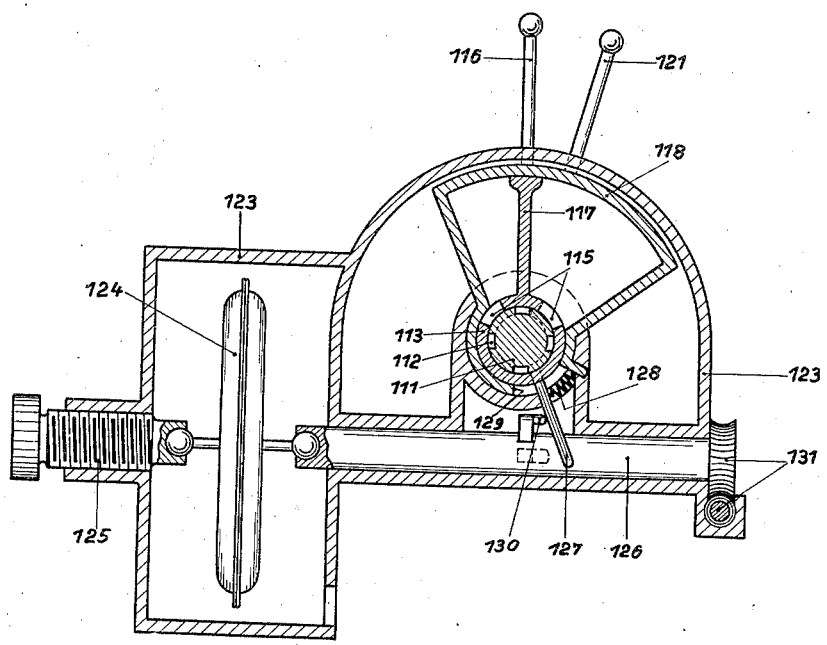
Fig. 6 is a vertical section of an arrangement according to Figs. 4 and 5, but in which the regulator is dependent upon flight altitude as well as acting as an idling governor.

In the construction shown in Figs. 4 to 6, the injection pump governor is a combination idling governor and altitude governor when the engine is used as an aircraft engine. The fuel regulation on idling is effected by the fact that, as a result of the action of the propeller during landing there is a lessening of the load, if regulation takes place merely according to the rate at which the motor turns over. As long as an airplane is still in the air, when the motor is set for idling, further reduction in the fuel feed must take place. When an airplane lands, the acceleration of the motor ceases so that the fuel feed must be increased in order to maintain the motor at the proper idling rate of rotation.

During operation of the motor at a rate above its idling rate, for example, on load or output delivery at the propeller, the idling governor must be cut out, so that only the altitude governor influences the feed of the fuel. The function thereof is to regulate the amount of fuel supplied to the motor according to the altitude. This regulation is particularly for motors for aircraft adapted to fly especially high so that the temperature of the exhaust gases cannot exceed a desired degree. On the other hand, for example, with motors for aircraft which fly only at average altitudes, the fuel feed should be limited so as to regulate it to a maximum efficiency sufficient only for the altitude to be attained.

In Figs. 4 and 5, an arrangement has been shown in which, according to the invention, regulation is effected for idling. The governor is influenced by the motor rate through an expansible pressure sensitive member 101 of the bellows type, which is disposed in a housing 102. The chamber formed by the housing 102 is connected through a passage 103 with the pressure chamber of a regulating pump 104. This pump delivers fuel from the motor circuit and is driven at the rotational rate of the motor.

The outer surface of the regulating member 101 is impinged by the fuel under delivery pressure, which enters the housing 102 through the passage 105. Passages 103 and 105 are interconnected by a passage 106, which latter passage is provided with a restricted nozzle 107.

Since the pressure sensitive member 101 is subjected at one outer end to the action of a spring 108, any pressure difference, and thus each different motor rate, corresponds to a certain length of the expansible pressure sensitive member 101. In order that the governor operate only within the rotational range involved for idling, the expansion of the pressure sensitive member 101 is limited by suitable abutments 109 and 110. These abutments may be rigidly mounted as shown in Fig. 4, or they may be constructed so as to be adjustable manually.

When the front part of the regulating member strikes against one or the other of these abutments 109 or 110, the rotational rate of the motor, and thus of the pump 104, ceases to exert any further influence on the adjusting member 101.

The member 101 is connected by suitable means with a control slide 111 preferably provided with spiral grooves 112. Control slides, such as the one indicated by the reference numeral 111, are known per se. The control slide shown is rotatable and is longitudinally slidable in the hollow governor shaft 113. The slide is guided in a guide 114 in the governor shaft 113, and this latter shaft is provided with control bores 115 which cooperate, or are adapted to come into alignment, with the grooves 112 of the slide 111.

The governor shaft 113 also carries a pump control lever 116, and a wing piston 117. The wing piston 117 operates in an adjusting member housing 118, which encompasses the governor shaft. The piston 117 is fitted tightly and is packed to divide the housing 118 into two chambers 135 and 136. Through this arrangement the two operative chambers 135 and 136 are connected through the grooves 112 and the bores 115. One of these chambers 135 is connected through a passage 119 (Fig. 4) with a pressure source (not shown), for example, the lubricating oil circuit of the motor. The other chamber 136 is connected through a passage 120 with the sump of the motor, or with any other point whereby the oil expelled through this chamber is enabled to flow off.

The housing 118 is connected rigidly with a hand adjusting lever 121 which is operatively connected through an abutment 122 with the slide 111. This abutment 122 is disengaged when the pressure sensitive member 101 strikes against the abutment 109 such as when the motor reaches its maximum idling rate. It is only in this state that it is possible to shift the hand lever 121 to permit a greater amount of fuel to be fed. The position of the housing 118 can be adjusted by means of the hand lever 121. As will be noted, the housing 118 is mounted for oscillation within the governor housing 123. The position of the housing 118 after adjustment by the hand lever 121 is assured by means of a friction brake 131.

As will be apparent, within the operative range of the idling governor, each specific rate of the motor corresponds to a certain length of the expansible pressure sensitive member 101. Consequently, each operative range corresponds with a certain position of the slide 111 with respect to the governor shaft 113. The wing piston 117 assumes a specific position with respect to the governor shaft 113. This is effected by the closure of the bores 115 by the wall portions of the slide lying between the grooves 112.

Within the regulating range of the idling governor, the quantity of fuel for obtaining the idling rate, set by the hand lever, is thus positively influenced in such a manner that the actions of the propeller can either cause an increase or a reduction of this rotational rate. Above the maximum idling rate, the governor acts as an oil coupling. The position of the piston 117 in the housing 118 is thus always the same above the maximum idling rate.

For driving the motor above the idling rate, the fuel regulation is effected only by that part of the governor which operates in accordance with the altitude of the motor. An arrangement of this type is shown in Fig. 6 in which the slide 111 is provided with an additional rotary movement through the influence of the altitude. For this purpose, a pressure sensitive regulating member 124, having an inner filling, is disposed in the governor housing 123 which in this case is enlarged. This member 124, when used with motors designed for only average altitudes, is impinged exteriorly by the air pressure. When used with motors for high flight, it is impinged by the pressure behind the first stage of the supercharger.

The pressure within the regulating member 124 is possible of adjustment through means, such as the thumb screw 125. Variations in the length of the regulating member as the result of pressure variations are transmitted to a control rod 126. The longitudinal movement of the control rod 126 is converted into rotational movement of the slide 111, and for this purpose lever 127 is used, which is rigidly connected with the slide 111. This lever is subjected, on the one hand, to the pressure of a spring 128, which is attached to the housing 118. On the other hand, it can move to an abutment 129 of the housing 118.

The lever 127 is adapted to engage a tooth 130 which is rigid with the control rod 126. The force of the engagement is made adjustable by rotating the tooth by means of an adjusting device 131.

The rotation of the slide 111 through the lever 127 causes the piston 117 to oscillate in the same manner as previously described. If, in motors for average altitudes, the pressure sensitive regulating member 124 is impinged exteriorly by the air pressure, the arrangement functions simply as an abutment, inasmuch as the maximum of the fuel injected is determined by rotation of the abutment 129 as the result of the influence of altitude.

Up to a certain altitude, determined by the base adjustment of the pressure sensitive member 124, the governor does not act, since the tooth 130 does not reach the lever 127. As the height of the aircraft increases, however, the pressure sensitive member 124 progressively expands, whereby the tooth 130 on the rod 126 shifts lever 127 against the force of the pressure spring 128, so that the quantity of fuel is reduced through action of the governor. In this position, if the hand lever 121 is moved in the direction of idling adjustment, nothing in the pump regulation is changed, until the lever 127 strikes against the abutment 129. Then, and only then, does the slide 111, and with it the piston and the housing, follow the hand shift lever 121. On drawing the lever 121 to full load, the parts of the governor follow, but only to the adjustment of the adjusting member provided by the regulating member 124.

For motors adapted for high altitudes, the governor differs in that the pressure sensitive member 124 is impinged by the charging air behind the first compressor stage. The output of the exhaust gas turbine driving the supercharger varies with the quantity of fuel injected, whereby the pressure of the charging air varies correspondingly. In this case the regulation thus acts on a maximum limitation of the exhaust gas temperature.

By constructing the governor in accordance with this last embodiment, it is possible to have three influences or three groups of influences exerted on a common adjusting member. The type of these influences and of the magnitudes to be regulated are immaterial for the operation or for the effects desired.

The invention is not to be limited to the precise forms or details of construction described, as these naturally may be varied to suit particular instances. The limits of the invention are only set forth in the claims which follow.

We claim:

1. Apparatus for regulating internal combustion engines, comprising hydraulic compensating means connected to the fuel feed of the engine to control the same automatically, said means being dependent on at least two determinative magnitudes, and additional means for manually adjusting said first named means.

2. Apparatus for regulating internal combustion engines, comprising fluid pressure means, said means consisting of two rotatably mounted parts, complementary in shape and operable relatively to each other in dependence of at least two determinative magnitudes, one of said parts being rigidly connected to the fuel feed means of the engine, the other part being provided with means for manual adjustment.

3. An apparatus in accordance with claim 2, said first named part comprising a wing piston, the other part comprising a housing disposed coaxially with respect to said piston and encompassing said piston.

4. Apparatus for regulating internal combustion engines, comprising a housing mounted to rotate about a fixed axis, a wing piston disposed within said housing and rotatable with respect to said housing about said axis, said wing piston dividing said housing into chambers, a fluid passage connected to said chambers and to a source of fluid under pressure, means for controlling the amount of fluid entering said chambers, said wing piston being rigidly connected with the throttle valve of said engine, and said housing being provided with means for manual adjustment.

5. In an arrangement according to claim 4, means for providing said rotatable housing with a preliminary tension operating in a direction for shifting the throttle valve to full load.

6. Apparatus for regulating internal combustion engines, comprising a housing mounted to rotate about a fixed axis, a wing piston disposed within said housing and rotatable with respect to said housing about said axis, said wing piston dividing said housing into chambers, a fluid passage connected to said chambers, said wing piston being rigidly connected with the throttle valve of said engine, said housing being provided with means for manual adjustment, a pressure sensitive member expansible in accordance with the pressure existing behind the throttle valve, a valve in said fluid passage and connected to said pressure sensitive member to be actuated thereby to control the amount of fluid under pressure entering said chambers.

7. A device as defined in claim 6, means for initially adjusting the pressure sensitive member to a predetermined pressure.

8. A device as defined in claim 6, means for initially adjusting the pressure sensitive member to a predetermined pressure, said last named means comprising a pair of interconnected complimentary coaxially disposed members movable toward and away from each other on their common axis, and separate means for actuating each of said coaxially disposed members.

9. A device as defined in claim 6, said device having a fluid outlet to permit escape of the fluid under pressure when said last mentioned valve is open.

10. Apparatus for regulating internal combustion engines, comprising a housing and a wing piston disposed therein, said housing and piston being mounted for relative movement with respect to one another, means for introducing a pressure agent into said housing to cause relative movement between said housing and piston, means connecting the throttle valve of the engine to move in accordance with said relative movement, and means for controlling said relative movement dependent upon at least two determinative magnitudes.

11. A device as defined in claim 4, said means controlling the amount of fluid entering said chambers, comprising a sliding valve movable to two positions in one of which fluid may enter a chamber, and in the other of which fluid may escape from said chamber.

12. A device as defined in claim 4, said means for controlling the amount of fluid entering said chamber comprising a valve, means operable within specific limits to actuate said valve in accordance with the rotational rate of the motor, and means operable beyond a limit of said last named means for actuating said valve in accordance with the altitude at which the engine is operating.

13. Apparatus for regulating internal combustion engines, comprising a housing and a wing piston disposed therein, said housing and piston being mounted for relative movement with respect to one another, means for introducing a pressure agent into said housing to cause relative movement between said housing and said piston in one direction, means for causing relative movement between said housing and said piston in the other direction when no fluid under pressure is passing to said housing, and means controlled by said relative movement for actuating the throttle valve of the engine being regulated.

14. Apparatus for regulating internal combustion engines, comprising a housing and a wing piston disposed therein, said housing and piston being mounted for relative movement with respect to one another, means for introducing a pressure agent into said housing to cause relative movement between said housing and said piston in one direction, or for by-passing said fluid so that full pressure does not enter said housing, means for causing relative movement between said housing and said piston in the other direction when no fluid under pressure is passing to said housing, and means controlled by said relative movement for actuating the throttle valve of the engine being regulated, said fluid introducing and by-passing means comprising a valve and a pressure sensitive member sensitive to pressure existing behind the throttle valve for actuating said other valve in accordance with said pressure.

15. Apparatus for regulating internal combustion engines, comprising a housing and a wing piston disposed therein, said housing and piston being mounted for relative movement with respect to one another, means for introducing a pressure agent into said housing to cause relative movement between said housing and said piston in one direction, or for by-passing said fluid so that full pressure does not enter said housing, means for causing relative movement between said housing and said piston in the other direction when no fluid under pressure is passing to said housing, and means controlled by said relative movement for actuating the throttle valve of the engine being regulated, said fluid introducing and by-passing means comprising a valve and a pressure sensitive member sensitive to pressure existing behind the throttle valve for actuating said other valve in accordance with said pressure, said means for causing relative movement in the other direction comprising a spring.

16. Apparatus for regulating internal combustion engines, comprising a housing and a wing piston disposed therein, said housing and piston being mounted for relative movement with respect to one another, means for introducing a pressure agent into said housing to cause relative movement between said housing and said piston in one direction, means for causing relative movement between said housing and said piston in the other direction when no fluid under pressure is passing to said housing, means controlled by said relative movement for actuating the throttle valve of the engine being regulated, and means for permitting hand adjustment of the position of said housing.

17. Apparatus for regulating internal combustion engines, comprising a housing and a wing piston disposed therein, said housing and piston being mounted for relative movement with respect to one another, means for introducing a pressure agent into said housing to cause relative movement between said housing and said piston in one direction, means for causing relative movement between said housing and said piston in the other direction when no fluid under pressure is passing to said housing, means controlled by said relative movement for actuating the throttle valve of the engine being regulated, means for permitting hand adjustment of the position of said housing, and means operable upon failure of said hand adjustment means for restoring the relative position of said housing and said piston to a position in which the other means mentioned for changing the relative position can function.

RUDOLF HAWLITSCHECK.
FRITZ BÖTTGER.